Figure 1:
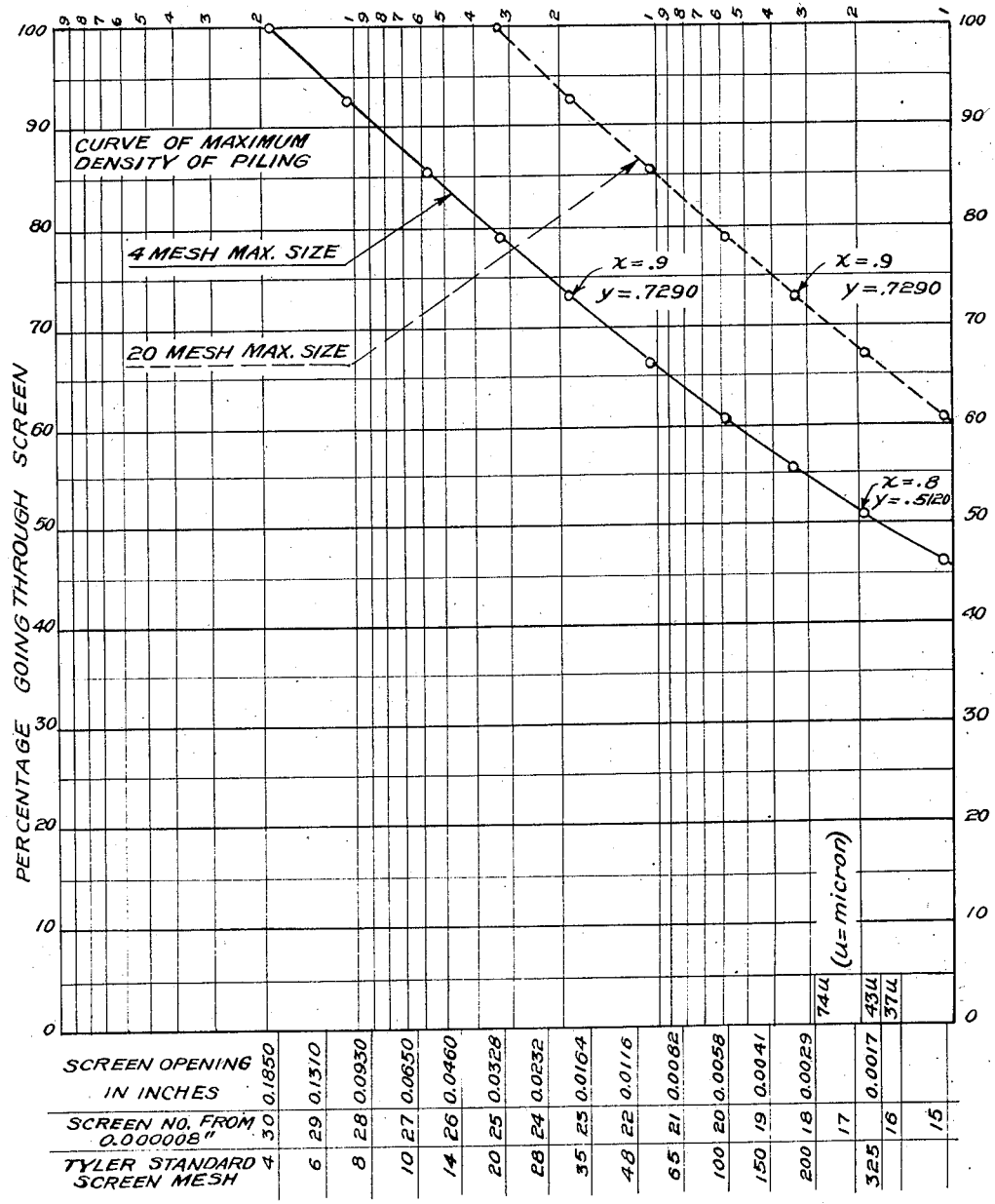

Oct. 5, 1943.   D. W. ROSS   2,331,232
METHOD OF MAKING REFACTORIES
Filed July 13, 1940   2 Sheets-Sheet 2

UNITED STATES PATENT OFFICE 2,331,232

METHOD OF MAKING REFRACTORIES

Donald W. Ross, Washington, Pa.

Application July 13, 1940, Serial No. 345,428

22 Claims. (Cl. 25—157)

My invention relates to a process of making refractories, and more particularly to the bonding of the materials in a refractory body.

In bonding of refractory materials, it is desirable that they be self-bonded, or that the bonding material be (1) sufficiently refractory; (2) resistant to chemical action under heat and slags; and (3) resistant to thermal shock, that the so bonded refractory will not fail because of the bond.

The bonds of refractories commonly consist of: (1) interlocking crystals of the refractory materials themselves or crystals of other refractory materials, or both, and (2) interstitial glass formed from the refractory materials themselves or from other refractory materials and impurities, or both. Such other (auxiliary) refractory materials sometimes occur naturally associated with the principal material, and at other times must be added to it.

The strength and life of a refractory body depends largely upon the qualities of the bond. Heretofore in the manufacture of refractories from the common refractory materials, the acid-forming elements have proven useless as "bond developers" for the reason that the acid element has been permitted to escape from, and cease to be in contact with, the refractory material, at temperatures at which it should be acting as bond developer.

Invariably the acid-containing compounds heretofore used have been those which are readily hydrolized or are the end-products of such hydrolysis. This fact has prevented their being of use as bond developers.

Present day kiln gases contain oxygen, carbon dioxide and water vapor, all of which are oxidizing agents of the compounds of the common refractory materials with the acid-forming elements. The result of such oxidation is an oxide of the refractory constituent of the compound and a hydrogenated compound of the acid-forming element. Such oxidation (decomposition) by water vapor is an hydrolysis. The result of this decomposition has been to produce a friable condition in the refractory composition instead of bonding the refractory grains together.

One object of my invention is to provide a method of developing bonds of superior quality, in refractory materials.

Another object of my invention is to provide a method whereby oxidation as by hydrolysis is prevented, in the compounds of the common refractory materials with the acid-forming elements.

Another object of my invention is to provide a method of so bonding silica and siliceous materials as to reduce their porosity and thermal expansion, and to increase their resistance to thermal shock.

Another object of my invention is to bond alumina and aluminous materials in such manner as to obtain low porosity, resistance to deformation under heat and load, and resistance to thermal shock and slags.

A further object of my invention is to bond magnesia in such manner that it will resist deformation under heat and load and be resistant to heat shock, slags and penetration by iron oxide.

Still another object of my invention is to so bond chrome and chromite that they will be resistant to deformation under heat and load and will resist thermal shock, slags and growth.

Figure 2:
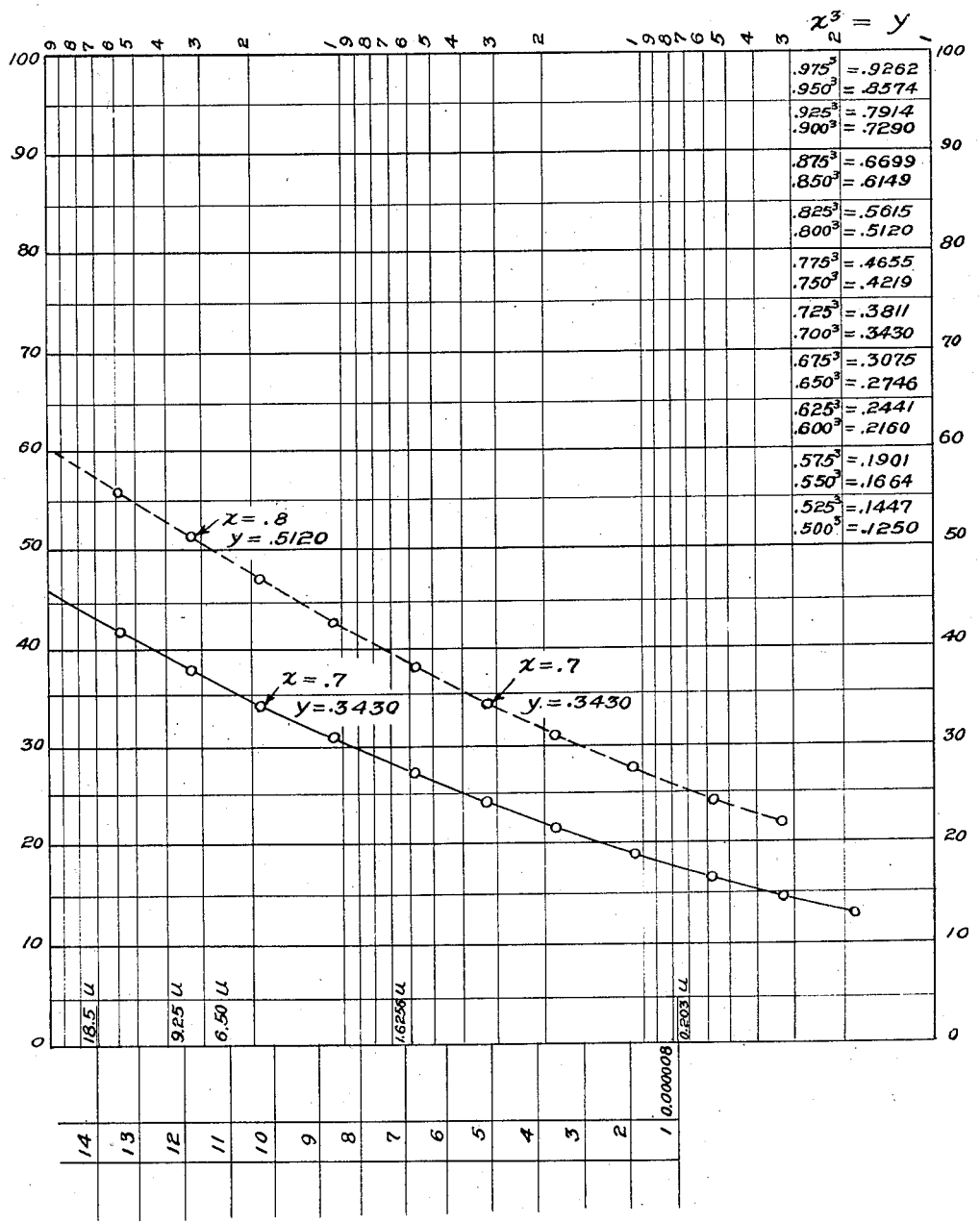

Figures 1 and 2 of the drawings, taken together, constitute a single chart wherein the diagonally-extending solid line shows an example of a gradation curve for material whose maximum particle size is −4 mesh (0.185″), and the dash line shows a portion of a chart for a gradation curve where the maximum particle size is −20 mesh (0.0328″).

The term "refractories" as used herein refers to the common refractory materials such as silica and silicates, alumina and aluminous materials, magnesia, magnesite and forsterite refractories, chromic oxide, chrome (the chrome ore used in chrome refractories) and chromite refractories.

The term "bond developers" refers to the acid-forming elements, that is to the typical acid-forming elements of groups V, VI and VII of the periodic table of elements; namely, sulfur, selenium, tellurium, the halogens (fluorine, chlorine, bromine, iodine, phosphorus, boron, boron oxide, carbon, nitrogen, arsenic and antimony.

By the term "oxidation" I include those cases in which hydrolysis takes place with resultant oxidation of the refractory element.

Under heat and in the absence of oxidation, all the acid-forming elements (bond developers) enumerated above, form compounds with any of the common refractory materials and with the metallic elements of the refractory materials, and these acid-forming elements combine with one another and with ammonia. Hence, in performing their useful function, these acid-forming elements can be present as compounds with one another and of the refractory and auxiliary refractory materials, and in compounds with ammonia, be in solid solution, and possibly be present in mixtures. After serving their useful purpose of developing bond during the firing of a refractory body, they may be eliminated from the refractory or be maintained therein, as desired. For my purpose of developing bond in refractory materials, it is sufficient if only a small percentage of the refractory material is combined with an acid-forming element at any one time.

This invention, therefore, includes the preventing, during at least part of the firing operation, of hydrolysis and other oxidation of the compounds of the common refractory materials with the acid-forming elements, and means of accomplishing the same.

A principle which I apply for prevention of oxidation during firing, comprises use of the law of mass action. For this purpose I use suitable solid, liquid and gaseous substances. These are here designated as "retaining agents". One aid in applying this mass action principle comprises providing non-oxidizing atmospheres in and surrounding the refractory during at least part of the processing period. Since the reactions herein concerned take place within the refractory, I may place the atmosphere-forming material either in or surrounding the refractory, or both in and surrounding it. Thus, in some cases, it may not be necessary to maintain high concentrations of the bond developing agents in the kiln chamber atmosphere. In cases in which special atmospheres are provided as retaining agents in the kiln, such atmospheres and partial pressures of atmospheres include (1) ammonia, carbon and silicon compounds of the respective acid-forming elements; (2) nitrogen, carbon, carbon monoxide, and the inert gases including helium, neon and argon, all in substantial absence of water vapor.

Hydrolysis of the refractory acid-forming compounds will not take place in the presence of suitable concentrations of the corresponding acid-forming radical (ion). For instance, damp magnesium chloride is hydrolized to magnesium oxide and hydrochloric acid, upon being heated in air. If, however, ammonium chloride be mixed with the magnesium chloride, the mixture not only can be dried without decomposition, but at higher temperatures the ammonium chloride can be volatilized off and the magnesium chloride melted as such. This prevention of decomposition during drying and firing results from the presence of the readily available mass of chlorine radical or ion of the ammonium chloride. Such common ion relation is, hence, one in which an acid element refractory compound is accompanied by an additional amount of the same acid element radical (common ion), supplied from a suitable compound containing it. The presence of the additional amount of the common ion serves to prevent decomposition of the acid element refractory compound. This common ion relation also exists between magnesium fluoride and ammonium fluoride. For this purpose I may use the magnesium ammonium fluorides, $MgF_3NH_4$ and $MgF_2(NH_4)_2$.

Furthermore, on being heated in the presence of the acid-forming elements hereof, the refractory oxide grains are attacked, thereby forming the respective acid-element refractory compound.

My use of bond-developing and retaining agents is hence to attack the surface of the refractory grains only to an extent sufficient for bonding purposes and then to prevent the decomposition of this acid-element refractory compound and the retaining agents until they have performed their useful function.

In so attacking the surface of refractory grains, I may prefer to have present sufficient other glassy bond so that as the acid element is dissipated or eliminated, the refractory oxide left behind dissolved in said glassy bond may remain as glass or may crystallize as a framework throughout the bond, instead of being present as dry powder crystals, which might disrupt the formed refractory ware. In addition to ammonia compounds of my acid-forming elements, their non-oxygen compounds with carbon and with each other serve as retaining agents; examples being carbon tetrachloride and carbon disulfide.

Heretofore, accessory bonding ingredients have commonly been depended upon to develop the bond as well as to serve as bond, and have, hence, usually been present in the completed refractory in greater than the permissible optimum amount, thus lessening the value of the refractory for its intended use. My use of special bond developers in conjunction with accessory bonds, permits the presence of the optimum amounts of accessory bonds in completed refractories. The presence of small percentages of silicates is particularly advantageous in the development of bonds in refractories. A possible explanation of the advantage of the presence of glassy bond is that at the time that the acid-element refractory compounds decompose, the refractory components are in a chemically reactive (nascent) condition and can readily dissolve in and crystallize from glassy bond, whereas if no glassy bond be present, the refractory components merely form masses of oxide throughout the body and are thereafter inert to solution and recrystallization.

In performing my process I may prefer to use a control substance (retaining agent) to the point at which the water of plasticity, hygroscopic moisture, and chemical and other waters which escape at relatively low temperatures, have been eliminated from the refractory. Such water can commonly be eliminated at temperatures of 121° C. to 204° C. Furthermore, in firing of my refractory compositions, water and other oxidizing substances are also released at relatively high temperatures. Thus chemically combined water may be released from clay-like substances at from 500° C. to 700° C., and the oxygen of iron compounds is variously released above approximately 700° C. I may thus prefer to maintain the atmospheres hereof as need be to meet these conditions.

The bond developers recited herein serve to develop both crystalline and glassy bond and serve other useful purposes. An instance of their unique usefulness is as follows. In the manufacture of refractories from granular material, it is common practice to use any particle size grading that the machinery at hand produces from the materials being processed. Insofar as such gradings have not been compact, with their particles interfitting closely, relatively high furnace temperatures have been resorted to, to soften the particles, so that they would draw together. It so happens that certain refractory materials, such as periclase and corundum, are so refractory and resistant to the usual chemical reactions in kilns that their particles do not soften and coalesce at usual present day kiln temperatures, with the result that the wares so made are inferior. My method of bond developing, although of general usefulness in bonding of refractory grains, is uniquely useful in bond of the above resistant grains. The bond developers (acid-forming elements) attack such resistant grains under heat, particularly at corners and edges of grains bringing such material into solution in the glassy matrix, where it may remain or from which it may crystallize by subsequent release from the bond developer. This permits the resistant grains to fit more closely together. Thus, in the production of a refractory from such resistant grains, I may prefer to size grade the resistant grains as per the formula $y=x^3$ of my co-pending application 239,184, filed November 5, 1938, and to fire ware made of them in the presence of my bond developers.

In applying my $y=x^3$ curve that is shown on the accompanying drawings, I use that portion of it which extends from 0 to $x=1=y$. Further, I plot the curve on one-way log. paper, non-logarithmically, so that successive tenths from 0 to $x=1$ are at the same point on successive cycles of the logarithmic direction of the chart. On Fig. 1, the $y=x^3$ curve is for a gradation whose maximum particle size is .185" (−4 mesh), and on Sheet 2, the curve is for a gradation whose maximum particle size is 0.0328" (−20 mesh). Data for construction of the $y=x^3$ curve for a gradation having any given maximum sized particle appears in the upper right-hand corner of Fig. 2.

The size grading is in accordance with a cumulative curve plotted on one-way logarithmic paper, with the logarithms of the screen openings, which are from 1 to the next larger, varied by the square root of 2 ($\sqrt{2}$) in the logarithmic direction of the chart, the cumulative volume percentage being arithmetically represented in the other direction of the chart, and the cumulative percentage through any given screen represented at the corresponding diameter on the portion of a cubic parabola, $y=x^3$, which lies between 0 and $x=1=y$, so constructed on the chart that "$x=1=y$" represents 100% of the material which passes through the screen, and each 0.1 of $x$ is represented by one cycle of logarithms on the logarithmic direction of the chart. These materials are moistened to give the desired plasticity and then formed to shape. They may thereafter be at least partially dried and then pressed to such extent that the body will be of low porosity, the acid elements being maintained in the body while firing.

Furthermore, contacting surfaces are at a maximum in proportion as the constituent grains fit together and are pressed into close contact. Such close packing of particles likewise entails but slight later shrinkage to obtain a given low porosity of finished ware. Certain aluminous materials, particularly those resulting from dehydration of hydrated alumina, such as diaspore, bauxite, and alumina hydrates, are very porous, and the pores of such very refractory materials do not close down except at very high heat treatments. The result of this is that they are not fully shrunk in manufacture and continue to shrink in use. I may, hence, prefer to aid low porosity of my product by subjecting it to pressures that crush the structures of porous materials contained therein and render them substantially non-porous, during the shaping of the ware. I may also prefer to render alumina relatively non-porous by chemical means, such as converting it into an acid-element-compound hereof, as by the use of a sulfate, a fluoride or a chloride, and then decomposing the alumina-acid-element-compound to alumina. The resulting alumina consists of non-porous crystals of corundum. In addition to obtaining non-porous alumina, I thus also obtain small grain sizes of corundum free from contamination which would be introduced by grinding. I may utilize my above-mentioned grading and pressing applications in accomplishing the above dense type of body.

Many refractories are destroyed during service, by slag penetrating their pores. Using my method of bonding refractories, it is possible to have interstitial bonds of such character that they coat the inside of the pores and lower the tendency of a given type of slag to enter the pores of a given refractory. Furthermore, I may provide interstitial materials of such character that they form compositions with the active components of the entering slag which retard further progress of the slag into the pores. Chromite, chrome and chrome-alumina solid solution in alumina tank blocks tend to lessen the tendency for commercial glass and glass ingredients to so penetrate the block.

It will be understood that the refractories treated according to my invention may be composed of the usual materials graded, mixed and shaped in conventional manner and by either pressing or casting operations, and thereafter dried preparatory to firing, it being understood also that the body will contain bond-developing ingredients, as heretofore explained. One manner of excluding oxygen from contact with the bond developer is by firing the dried refractory shape in an air tight chamber, to the usual firing temperature of cone 14, more or less. The furnace or the shell chamber thereof may suitably be of relatively pure iron, which will serve to a degree to retain the heated gases therein, because it not only resists their chemical action, but can easily be made air tight. The iron shell will preferably be lined with an insulating material to prevent deformation thereof under firing temperatures and loss of heat. The firing chamber can be heated by electrical resistors within or outside of the chamber; by exothermic reactions therein; by the use of heated gases either internally or externally thereof, etc. Also, the heating can be electrically by passing the current through the ware and using the ware as an electrical resistor. Furthermore, the heating can be accomplished by replacing or partially replacing the chamber atmospheres with new hot atmospheres.

Fluorine-containing atmospheres can be generated by passing the hot kiln gases through fluorine-containing compounds before they pass to the ware; by placing fluorine-containing ware between and surrounding other ware; and by firing fluorine-containing ware distributed among the other ware in a rotary kiln and in a tunnel kiln. In the latter instance, the fluorine-containing gases which escape from the ware wherein they are produced, are caused to flow to the cooler ware which is being heated, and eventually the fluorine may be recovered by conventional methods, and by absorption thereof by ammonia, lime and other basic substances.

The heat of exothermic reaction may be provided within the chamber through the reaction of the exothermic elements, either extraneously of the ware or within the ware.

As an example of the employment of exothermic heating, I wet ram between tuyères in the bottom of a Bessemer furnace a composition which contains topaz 15%; clay (plastic bonding) 15%; metallic aluminum 2% to 5%; kyanite 65% to 72%—of the dry weight of the mix. After ramming, the furnace is heated to about 625° C., at which temperature the aluminum takes fire and takes oxygen from its surroundings, thus generating so much heat that it liberates fluorine from the topaz, and thereby also supplements the usual furnace heat and develops bond in the refractory mass.

The following is one means of providing a specific atmosphere for my processing chamber. The particular atmosphere is one of carbon monoxide, free of moisture and containing nitrogen. Such atmosphere is produced by passing dry air through red hot coke. To suitably control the chamber temperature, part of the chamber contents can be recirculated. This recirculated portion can be passed through a heat exchanger, and then can be dehydrated and otherwise rejuvenated, following which it may be returned to the chamber, any fraction of it being first repassed through the bed of red hot coke. The exchange heat may be utilized in connection with the process as need be; for instance, it may be desirable to use it at least in part of the cascade heating surrounding the chamber.

During firing, permanent expansion and weight changes of the common refractory materials occur in accordance with their temperatures and are relatively rapid, their speeds of reaction being increased, by rise of temperature above their threshold temperatures. Weight losses are accompanied by decrease in bulk-specific-gravity. Permanent expansions and other decreases in bulk-specific-gravity tend to cause ware to be undesirably friable. Although bond developers tend to draw the grains of a refractory together with resultant increase in bulk-specific-gravity (decrease in porosity), their action tends to be slow and gradual, and is thwarted in proportion as the mass becomes expanded and friable. It is therefore advantageous to maintain the common refractories but slightly above such threshold temperatures for sufficient periods of time to permit bonding, drawing together of the particles thereof. This procedure is particularly useful in the firing of silica brick. I accomplish this as follows:

Although it is not common practice, measurement of the "settle of a kiln," that is, the shrinkage of the ware during firing, is well known. Furthermore, although it is not common practice, weighing of a piece of ware during the early stages of firing to determine its dryness is known. In connection with the "principle of mass action" heretofore referred to, I may prefer more or less continuously to measure the expansion and contraction of ware during firing and to synchronize the firing temperature and composition of the atmosphere therewith as by means of templates or gauge plates with which the ends of pantographs have engagement. I may do this throughout any desired portion of the firing and cooling operation. Furthermore, I may prefer similarly and simultaneously to synchronize temperature control with a more or less continuous weighing device. I may prefer not only to maintain the weighing device through the drying range, but also through dehydration ranges and through other physical and chemical changes involving weight change.

To summarize somewhat the practice of my invention, it comprises the use with the common refractory materials, of bond-forming materials including silicon, aluminum, magnesium, iron chromium, boron and its oxides, and bond developers (acid-forming elements), the bond developers being retained as need be in the refractory by the use of chemical retainers which include suitable vapor pressures of the acid-forming elements in non-oxidizing atmospheres, or ammonium compounds of the acid-forming elements, or a combination of such pressures and compounds, during at least part of the firing and heating. The bond-forming materials and bond developers are commonly introduced as chemical compounds of the refractory materials. If, during heating, the specific bond developers are sufficiently involatile and resistant to decomposition by water vapor, oxidation and otherwise, very little or no other precaution need be taken to prevent their escape. The refractory-acid-element containing substances that are not appreciably hydrolized or otherwise decomposed below red heat are such materials. In proportion as they tend to escape, however, provision is made to retain them, this being accomplished by means of the chemical retainers referred to, or enclosure in suitable firing chambers as described.

In practicing my bonding method, I contemplate using those bond-developing materials in which the developing agent is held rather tenaciously, thus not requiring special chemical retainers or enclosures. Such materials are topaz, aluminum borate, boron carbide, boron nitride, and magnesium fluoride. Topaz is alumino-silico-fluoride, whose composition can be expressed as $2Al_2F_3.3SiF_4$. This material has the advantages that it contains alumina in rather large percentage, which, by suitable processing, can be retained in the final product as corundum, and silica in lesser percentage, which silica can be made to serve largely as glassy bond.

There is evidence which indicates that on heating topaz in the presence of water vapor, the OH of the water directly replaces fluorine, and that the freed fluorine combines with the released hydrogen forming hydrofluoric acid. At still higher temperatures, this hydrated material is dehydrated to silicon and aluminum oxides. This, then, is apparently an analogous case to that mentioned above of the decomposition of magnesium chloride on being heated in the presence of water vapor.

I improve the effectiveness of the fluorine by using the topaz as a component in bodies with refractory materials with which its fluorine content is reactive, such as free alumina or free silica, or both. I may use the topaz finely ground, thus increasing its dissemination through the mass of other materials and increasing its contacting surface therewith, although such mechanical contacting is not so very effective, as shown in recent tests by Lin and Taylor at Pennsylvania State College on silica. On the other hand, I make the fluorine effective by maintaining it in the ware at temperatures at which it would otherwise escape. I do this by absence of water vapor, by presence of carbon and fluorine vapor, such as from elemental fluorine, or either, and by suitable fluorine-bearing compounds such as ammonium fluoride. I may, however, prefer to use the topaz as rather coarse grains. Topaz-containing refractory material that is largely alumina, on being fired by natural gas in ordinary down draft kilns, begins to lose its fluorine rapidly at approximately 1260° C. (cone 8); the escaping fluorine being substantially all off at approximately 1388° C. which corresponds to approximately cone 14 in ordinary procedure of firing down draft kilns. On being similarly calcined, relatively pure topaz actively loses its fluorine content at cone 03, and the fluorine is substantially all off at cone 14.

Some typical examples of compositions which I employ are as follows, it being understood that the bodies containing the enumerated materials are first wet by the use of sufficient water to permit shaping thereof and are then dried and fired. (Percentages named herein refer to dry weight of the mix.)

Example 1

| | Per cent by weight |
|---|---|
| Dehydrated alumina | 75 |
| Topaz (raw rock) | 25 |
| | 100 |

Example 2

| | Per cent by weight |
|---|---|
| Siliceous clay, 82% SiO$_2$ | 60 |
| Topaz (raw rock) | 15 |
| Aluminum borate (2Al$_2$O$_3$B$_2$O$_3$) | 25 |
| | 100 |

Example 3

| | Per cent by weight |
|---|---|
| Dehydrated alumina* | 75 |
| Topaz* (raw rock) | 20 |
| Magnesium fluoride (MgF$_2$) | 5 |
| | 100 |

Example 4

| | Per cent by weight |
|---|---|
| Dehydrated alumina* | 55 |
| Topaz* (raw rock) | 15 |
| Aluminum borate (2Al$_2$O$_3$B$_2$O$_3$) | 25 |
| Aluminum metal powder | 5 |
| | 100 |

In Example 1, the silica of the topaz serves as glassy bond in which crystallization can take place during firing, while the silicon fluoride and/or fluorine coming from the topaz as it does at a temperature at which it can serve as a bond developer, is active on both the silicon and aluminum present and serves to develop bond in the mix before escaping from it. Auxiliary fluorine content may be supplied by a fluorine content in the atmosphere as required.

In Example 2, the situation is similar to that in Example 1, with the additional feature that the boron content of the aluminum borate also becomes available at elevated temperatures at which it can be effective in developing bond. Under the conditions existing in such a mix while it is being fired, boron fluoride is supposedly formed.

In silica glass and the highly siliceous eutectic glass of silica-alumina compositions, the effect of boron in improving resistance to thermal shock is supposedly akin to polymerization of the silica. Carbon resembles silicon and boron in many of its properties. It is a known fact that boron fluoride (BF$_3$) is a polymerizer of many carbon compounds. My experience to date indicates that boron fluoride does form under such firing conditions and that it aids in production of interstitial bond of such character that silica containing refractories are made more resistant to heat shock than they otherwise would be.

In Example 3, the situation is similar to that in Example 1 with the additional feature of introducing a magnesium content, which content serves in developing bond and remains in the refractory after firing. Although magnesia lowers the refractoriness of silica-alumina refractories, it has a favorable effect in increasing the resistance of the alumina content to thermal shock.

In Example 4, the situation is similar to that in Example 2, with the additional feature that metallic aluminum at elevated temperatures reacts with the acid-forming elements, including fluorine and boron, liberating heat, and in turn, when permitted to do so, the aluminum of these compounds oxidizes, by means of hydrolysis of the compounds with liberation of additional heat. The total heat per gram of aluminum oxidized is very great, and its attraction for oxygen is so great that at elevated temperatures it actually takes oxygen away from silica, so that silicon and not aluminum is the later material in obtaining a full quota of oxygen.

Other examples of silica-alumina raw batches are as follows:

Example 5

| | Per cent |
|---|---|
| Topaz, calcined * (by firing to cone 13), 4 mesh to fines | 40 to 44 |
| Topaz, calcined,* 48 mesh to fines | 30 to 31 |
| Raw topaz,* 4 mesh to fines | 20 to 22 |
| Plastic clay | 10 to 3 |
| | 100  100 |

Example 6

| | Per cent |
|---|---|
| Dehydrated alumina | 70 |
| Hydrated alumina | 5 |
| Topaz (raw rock) | 25 |
| | 100 |

Example 7

| | Per cent |
|---|---|
| Clay | 20 |
| Topaz (raw rock) | 20 |
| Kyanite | 60 |
| | 100 |

* Size graded per graduation curve $y = x^3$.

I have found that a topaz content between .5% and 35% of the raw refractory batch (.065% to 4.55% fluorine) is generally the most favorable range, although larger percentages will serve insofar as they do not cause undue accumulations on the surface of the ware during firing, which accumulations would remain on the ware after firing. I have also found that the topaz generally serves best if a large proportion of it constitutes part of the coarser particles of the raw mix. By thus using topaz largely as coarser grains in silica-alumina refractories having grains of 4 mesh and finer, I have obtained lower porosity of fired ware than when the topaz has been used largely as in 325 mesh grains. Let us conceive of a body whose largest grains are 4 mesh (0.185 inch). In this my effect would be accomplished if a majority of the weight of topaz was in grains of not less than 8 mesh 0.093 inch. Greater percentages "on" would be more effective, and lesser percentages would be less effective.

Thus I may make a topaz-containing body in which the body is largely topaz and the balance of the body is merely enough alumina and/or silica to react with the fluorine of the topaz, or the body may be largely aluminous and/or siliceous material with just sufficient topaz to furnish the necessary amount of fluorine for purposes of reacting with the materials of the body, bonding them and reducing their porosities a satisfactory amount. Such body may contain diaspore, bauxite, corundum, and/or dehydrated alumina together with topaz, and during the firing thereof I may prefer to use the retaining agents hereof from room temperature through the temperature range in which fluorine would come off if not retained. The retaining agents, retaining the first fluorine that tends to come off, starts fluorine reacting as a flux, so that retained fluorine can be expected to be effective at temperatures far below the 1260° C. mentioned above for open firing. One means whereby this retention can be accomplished is by embedding the fluorine-containing ware in carbon and protecting the carbon sufficiently from oxidation so that it will not all burn away until it has had opportunity to perform its useful function.

As another example, I may choose to use a more reactive material than the topaz. Thus, in Examples 1 and 5, I may replace the raw topaz in whole or in part by aluminum-borate or magnesium-fluoride, or both. On being heated, these two materials react, forming boron fluoride, magnesium borate and aluminum fluoride with liberation of some heat. It is of course desirable that there be sufficient siliceous and/or other auxiliary refractory material present to serve as matrix, so that the resultant product will be bonded together instead of falling apart as grains of powder. I may use a percentage of aluminum borate $3Al_2O_3B_2O_3$ (melting point approx. 1650° C.), such that in relation to the amount of fluorine present only part of the aluminum borate will be decomposed. Aluminum fluoride ($Al_2F_6$) normally forms from dehydrated alumina and a fluoride gas at temperatures between 400° C. and approximately 700° C. Above this latter temperature the aluminum fluoride begins to volatilize rapidly. The attacking of the surface of the aluminum borate particles by the fluoride in the presence of interstitial glass should serve to bond any remaining aluminum borate with the balance of the body. Magnesium fluoride $MgF_2$ is insoluble in water. It melts at 1396° C. and does not decompose readily when calcined in presence of oxygen. It crystallizes from a refractory glass in the form of long needle-like crystals. Magnesia and boron on being fused together form magnesium diborate ($2MgO_2B_3O$) and magnesium tetraborate ($3MgO.2B_2O_3$). On cooling, the former forms elongated crystals, and the latter prismatic ones. Magnesium borate is not very refractory. I may, hence, prefer to maintain little if any of it in the finished refractory ware. I can accomplish its removal on account of the fact that it is slowly decomposed at high temperatures in the presence of water vapor, the $B_2O_3$ content passing off while the magnesium oxide remains behind in the glass or combines with alumina to form spinel, $MgO.Al_2O_3$ (M. P. 2135° C.) and/or magnesium-aluminum-silicate (cordierite) $2MgO.2Al_2O_3.5SiO_2$ (M. P. approx. 1545° C.), with possibly a trace of solution remaining to as low a temperature as 1362° C. Cordierite serves as an excellent bonding material. It imparts low thermal expansion and toughness to alumina ware containing it. It is not, however, very refractory. Hence, I commonly prefer to maintain little if any of this material in the finished refractory ware.

As an example of a refractory made from this type of batch, I may obtain a body that is largely corundum, $Al_2O_3$ (M. P. 2040° C.), and possibly a little aluminum-borate, bonded by a small amount of interstitial glass shot through with magnesia-alumina spinel ($MgO.Al_2O_3$). Minor ingredients may be aluminum-fluoride ($Al_2F$), magnesium-aluminum-silicate cordierite $2MgO.2Al_2O_3.5SiO_2$) magnesium borate and at least part of their reaction products serving as the glassy bond, and a suitable retaining agent will be employed. The following example recites a suitable batch.

*Example 8*

| | Per cent by weight |
|---|---|
| Dehydrated alumina | 80 |
| Hydrated alumina | 5 |
| Magnesium fluoride | 2 |
| Aluminum silicate (clay) | 3 |
| Aluminum borate | 10 |
| | 100 |

I may prefer to introduce an auxiliary percentage of chromium either as chromium or as a suitable chromium-containing compound, at least part of which chromium will be present in the bond in the finished refractory ware. Chromium, thus present in the bond, tends to retard penetration of commercial glass, and many other slags and glasses, into the pores of the refractory. On being heated with alumina, chromic oxide forms solid solutions with the alumina, but aluminum-chromite is not apt to be formed.

Passing now to still another example, I may use agents that easily volatilize off unless retained, and provide retaining agents as required. Thus, I may prefer to replace the topaz in whole or in part by materials such as aluminum-fluoborate, aluminum-silico-fluoride, and/or magnesium-ammonium-borate. In addition to, and/or in place of, the above-enumerated retaining agents, I may specifically prefer to use carbon tetrafluoride, ammonium fluo borate, boron fluoride, ammonium fluoride and/or ammonium-borate as retaining agents. These substances, like the boron fluoride mentioned above, should be particularly useful for this purpose, as both ions of each of them actively attack the refractory materials under the conditions hereof, and develop bond. A typical batch may be:

*Example 9*

| | Per cent by weight |
|---|---|
| Dehydrated alumina | 78 |
| Hydrated alumina | 5 |
| Aluminum fluo borate | 10 |
| Ammonium fluoride | 2 |
| Ammonium borate | 2 |
| Aluminum silicate (clay) | 3 |
| | 100 |

It is commonly known chemistry that many of the chemical reactions of the type involved in my process are strongly exothermic. Some of them are so exothermic that if used in proper proportions and the reactions be suitably started, they automatically go to completion. I utilize this exothermic property for forming ware in place, providing that the escaping heat can do no harm to the surroundings. I may also prefer to use this exothermic property in firing in cases where furnaces are not available for firing the ware. In the case of ware formed in place, I prefer to use compositions which exhibit little or no shrinkage from the process, or which expand. In this case, as in other applications of my process, I may prefer to use raw batch materials which retain their boron and fluorine contents rather tenaciously and which are relatively insoluble in water. (See specific example of exothermic heating heretofore recited.)

Above I have described the processing of aluminous materials in conjunction with the bond developers boron and fluorine. It is to be understood, however, that the other bond developers hereof (the acid-forming elements) serve similarly, with, of course, the respective variations of their various compounds as to melting point, vapor pressure, heat of reaction, and free energy in the state and at the temperature in which they are used.

As an example of bonding siliceous materials by my method, I may start with a siliceous material and add aluminum-borate and aluminum-fluoride in desired proportions, such that 0.25% to 5% of boron, as $B_2O_3$, will be present in the finished ware. In siliceous ware, the boron oxide content serves to render the ware less subject to thermal shock, arising from its silica content. The processing of this batch is by the same retaining agents as noted above.

As an example of a magnesian refractory, I may start with highly magnesian materials such as periclase, plus light calcined magnesia, and add thereto a small amount of a siliceous material and aluminum-borate (these two serving to form glassy matrix in which the other materials may crystallize), and magnesium-fluoride. The processing of this batch is by the same retaining agents as noted above.

Another batch may be:

Example 10

| | Per cent |
|---|---|
| Dead burned magnesite containing some silica | 82 |
| Brucite (magnesium hydrate) | 10 |
| Aluminum borate | 4 |
| Magnesium fluoride | 4 |
| | 100 |

In this example the magnesium fluoride should serve as a "chief" bond developer over a rather wide temperature range. Boron fluoride is probably formed, and while it remains in the ware, is active in rendering the silica content resistant to thermal shock, part of the boron probably remaining in the siliceous glassy bond if such be present. The alumina content released as it is in molecular sizes and in presence of active bond developing solution, should go into solid solution with the magnesia and possibly also form alumina-magnesia spinel. I may also prefer to use a content of magnesium ammonium fluorides ($MgF_3NH_4$ and $MgF_2(NH_4)_2$).

As an example of a chromium-containing refractory, I may start with rather pure chromite, $FeO.Cr_2O_3$, although I may prefer to have some replacement of FeO by MgO, and of $Cr_2O_3$ by $Al_2O_3$, the auxiliary constituents being a slight amount of silica and/or boron or boron oxide to serve as glass in which the other ingredients can crystallize. To this I may prefer to add chromium and magnesium contents, or either, to reinforce the rigidity of the bond in the finished ware, and a fluorine content which may be introduced as such and/or in suitable combination. The processing of this batch is by a suitable retaining agent as noted above.

Example 11

| | Per cent by weight |
|---|---|
| Chromite (some replacement of FeO by MgO and of $Cr_2O_3$ by $Al_2O_3$ and silica) | 82 |
| Magnesium borate | 4 |
| Magnesium fluoride | 4 |
| Magnesia (as brucite) | 10 |
| | 100 |

The above examples have been largely in connection with the one bond developing agent, fluorine. In the last above example, I may prefer to substitute sulfur in whole and/or in part for fluorine as the bond developing agent. This is done on account of the fact that sulfur is very effective on iron and its compounds. Since, however, sulfur-ion compounds are not desirable in the finished refractory, I may prefer slowly to remove the sulfur after it has served its useful purpose. This may be done as by oxidation and/or replacement by one of the other bond developers or auxiliary refractory materials. The halogens are particularly effective in replacing sulfur, and the resulting action is exothermic. Oxidation of the resulting halogen compound is also exothermic. By use of these two steps an appreciable amount of the heat required for processing arises from the reactions thereof.

A review of the examples presented indicates that the common refractory materials hereof (alumina, silica, magnesia, and chrome) can each be bonded by use of: silica and boron oxide (as a glassy bond in which to crystallize other bond-forming agents); the refractory oxides in auxiliary amounts (to serve as bond); and an acid element content (to serve as bond developer).

The term "acid-forming elements" as employed in the claims comprises all of those acid-forming elements heretofore named and referred to as "bond developers."

I claim as my invention:

1. The method of developing fire and shock resisting bond in silica-alumina refractories, which comprises maintaining percentages of fluorine and $B_2O_3$ in the composition during desired parts of the firing period thereof, not over 5% of the $B_2O_3$ content remaining in the composition of the refractory on completion of the firing.

2. The method of developing fire and shock resisting bond in silica-alumina refractories, which comprises maintaining desired percentages of fluorine and $B_2O_3$ in the composition during desired parts of the firing period thereof, not over 5% of the $B_2O_3$ content remaining in the composition of the refractory on completion of the firing, and at least part of the boron content being supplied by aluminum borate placed in the raw batch of the refractory.

3. The method of processing common refractory materials that have a fluorine content, which comprises forming a body thereof, firing the body in a confined chamber which will prevent escape of the fluorine gases, to a point at which the said compounds perform their bonding function, the fluorine content being present in quantity only sufficient to perform a bonding function and the body being substantially free of fluxes other than the fluorine.

4. The method of processing common refractory materials that contain acid-element refractory compounds, which comprises forming a body thereof, firing the said body in a confined atmosphere having a substantial acid-element content, to a point at which the said compounds perform their bonding function, the acid element of the atmosphere being supplied by material added to the atmosphere that is confined around the body and to that emanating from the material contained within the body, the body being substantially free of fluxes other than the acid element material.

5. The method of developing fire-resisting bond in refractories, that comprises forming a refractory body, maintaining a percentage of fluorine in the body during at least part of the firing thereof, the fluorine content being supplied at least in part by a fluorine content in the pores of the body and in the atmosphere surrounding the body, the fluorine content being sufficient only to perform a bonding function and the body being substantially free of fluxes other than the fluorine.

6. The method of developing fire-resisting bond in refractories that contain acid-element refractory compounds in quantity only sufficient to perform a bonding function, which comprises forming a body thereof, maintaining at least one of the acid-element refractory compounds in the body as a constituent of a compound in the batch, in the absence of a substantial quantity of fluxes other than the said acid-element, during at least a part of the firing period, and preventing hydrolysis of the compounds by rendering water non-available to them, through the use of an inert gas, carbon, and the common ion compounds hereof that will not reduce the refractoriness of the body.

7. The method of processing common refractory materials that include a fluorine-containing substance and a boron-containing substance, which comprises firing the materials and maintaining percentages of said substances in the materials during at least part of the firing period.

8. The step in the processing of refractory bodies, which comprises maintaining an acid-forming element in a body while firing the body to a point at which there is reaction between the acid-forming element and refractory constituents of the body, to such extent that the substance of a secondary bond becomes formed, the body being substantially free of fluxes other than the said element.

9. The method of developing fire-resisting bond in refractories, that comprises maintaining percentages of boron and fluorine in refractory ware during at least part of the firing thereof, providing an acid element content which is supplied at least in part by an acid element content in the pores of the ware and in the atmosphere surrounding the ware, at least part of the acid elements being present as boron-fluoride.

10. The method of developing fire-resisting bond in refractories, that comprises maintaining a percentage of fluorine in refractory ware during at least part of the firing thereof, the fluorine content being supplied at least in part by a fluorine content in the pores of the ware and in the atmosphere surrounding the ware, at least part of the fluorine being present in the form of one of the ammonium fluorides.

11. The method of developing fire-resistant bond in refractories, which comprises maintaining an acid-element in refractory ware during a desired part of the firing period thereof, the acid element content being supplied, at least in part, by an acid element content in the pores of the ware and in the atmosphere surrounding the ware, and preventing hydrolysis of the acid element compounds which are in the ware by excluding water from the atmosphere during the said part of the firing period.

12. The method of developing fire-resistant bond in refractories, which comprises maintaining an acid element in refractory ware during a desired part of the firing period thereof, the acid element content being supplied, at least in part, by an acid element content in the pores of the ware, and preventing hydrolysis of the acid element compounds which are in the ware, by maintaining a partial pressure of an inert gas surrounding the ware during the said part of the firing period.

13. The method of processing common refractory materials that contain acid-element refractory compounds, which comprises firing the said materials in an atmosphere that prevents hydrolysis of the said compounds to a point at which the said compounds perform their bonding function, and then so reducing the non-hydrolyzing conditions as to permit slow discharge of excess acid-forming elements from the refractory materials, the said elements being present in quantity only sufficient to perform a bonding function.

14. The method of processing common refractory materials that contain acid-element refractory compounds, which comprises firing the said materials in a confined atmosphere, to a point at which the said compounds perform their bonding function, and then permitting escape of excess quantities of the acid-forming elements from the composition of the ware.

15. The method of processing common refractory materials that have a fluorine content, which comprises firing the materials in a confined chamber which will prevent escape of the fluorine gases, to a point at which the said compounds perform their bonding function, and then, while still firing, permitting escape of excess quantities of the fluorine from the composition of the ware.

16. The method of developing fire-resisting bond in the common refractories, which comprises maintaining at least one of the acid-element refractory compounds in a refractory body as a constituent of a compound in the batch, and in the presence of carbon, during at least a part of the firing period, and preventing hydrolysis of the compounds, by rendering water non-available to them, through the use of an inert gas and common ion compounds that will not reduce the refractoriness of the body.

17. The method of developing fire-resisting bond in the common refractories, which comprises maintaining at least one of the acid-element refractory compounds in a refractory body, during at least a part of the firing period, and preventing hydrolysis of the acid-element refractory compounds during the period, by the presence in the atmosphere of a common ion acid-element compound.

18. The method of processing common refractory materials that contain acid-element refractory compounds, which comprises firing the said materials in a confined atmosphere, which contains an additional common ion acid-element content, to a point at which the said compounds perform their bonding function, and then, while still firing, permitting escape of excess quantities of the acid-forming element from the composition of the ware.

19. The method of developing fire-resisting bond in refractories, that comprises maintaining a percentage of fluorine in refractory ware during at least part of the firing thereof, the fluorine content being supplied at least in part by a fluorine content in the pores of the ware and in the atmosphere surrounding the ware, at least part of the fluorine being present in the form of one of the ammonium boro fluorides.

20. The method of processing common refractory materials that contain acid-element refractory compounds and common ion compounds of the same acid-forming elements, which comprises firing the said materials in a confined atmosphere which contains a content of the same common ion acid-forming elements, to a point at which the acid-element refractory compounds perform their bonding function.

21. The method of making low porosity, bonded refractories of the common refractory materials that contain acid-element compounds, which comprises size-grading the constituents in accordance with a cumulative curve plotted on one-way logarithmic paper, with the logarithms of the screen openings, which are of from 1 to the next larger, varied by the square root of 2 ($\sqrt{2}$) in the logarithmic direction of the chart, the cumulative volume percentage being arithmetically represented in the other direction on the chart, and the cumulative percentage through any given screen represented at the corresponding diameter on the portion of a cubic parabola, $y=x^3$, which lies between 0 and $x=1=y$, so constructed on the chart that "$x=1=y$" represents 100% of the material which passes through the screen, and each 0.1 of $x$ is represented by one cycle of logarithms on the logarithmic direction of the chart; moistening the materials, forming, drying at least partially and pressing the formed ware to such extent that the body will be of low porosity, and then maintaining the acid-elements in the body while firing it to a point at which there is reaction between the acid-elements and refractory constituents of the body.

22. The step in the processing of refractory bodies, which comprises maintaining an acid-forming element in a body that is mainly alumina, while firing the body to a point at which there is reaction between the acid-forming element and the refractory constituents of the body, to such extent that the substance of a secondary bond becomes formed, the body being substantially free of fluxes other than the said element.

DONALD W. ROSS.